(12) United States Patent  (10) Patent No.: US 8,325,333 B2
Jywe et al.  (45) Date of Patent: Dec. 4, 2012

(54) GEOMETRIC ERROR MEASURING DEVICE

(75) Inventors: Wen-Yuh Jywe, Huwei Township, Yunlin County (TW); Teng-Yu Yang, Taichung (TW); Tung-Hui Hsu, Kaohsiung (TW)

(73) Assignee: National Formosa University, Yunlin County (TW)

( * ) Notice: Subject to any disclaimer, the term of this patent is extended or adjusted under 35 U.S.C. 154(b) by 290 days.

(21) Appl. No.: 12/612,400

(22) Filed: Nov. 4, 2009

(65) Prior Publication Data

US 2011/0102778 A1    May 5, 2011

(51) Int. Cl.
*G01B 11/26* (2006.01)
(52) U.S. Cl. .............. 356/139.1; 356/139; 356/139.03; 356/139.04
(58) Field of Classification Search ........ 356/3.01–28.5, 356/139.01–139.1
See application file for complete search history.

(56) References Cited

U.S. PATENT DOCUMENTS

| | | | | |
|---|---|---|---|---|
| 3,723,013 A | * | 3/1973 | Stirland et al. | 356/152.1 |
| 4,665,795 A | * | 5/1987 | Carbonneau et al. | 89/41.03 |
| 4,884,889 A | * | 12/1989 | Beckwith, Jr. | 356/620 |
| 6,175,413 B1 | * | 1/2001 | Lucas | 356/614 |

* cited by examiner

*Primary Examiner* — Luke Ratcliffe
(74) *Attorney, Agent, or Firm* — Chun-Ming Shih

(57) ABSTRACT

A geometric error measuring device includes a measuring module and at least one (quadrant) photodiode. The measuring module has an emitting deice, which may emit at least one light ray; the photodiode may receive the incident ray. Also, the trajectory of the incident ray is parallel with the direction of measurement. If there is no geometric error, the position of the incident light ray will coincide with the position of the measured light ray. If there is a geometric error, the position of the measured light ray will not coincide with the position of the incident light ray. After the data are processed and calculated, geometric errors in straightness, squareness and rotational angles (pitch, yaw and roll) may be obtained. These geometric errors may then be corrected in the setup of a machine.

8 Claims, 7 Drawing Sheets

GEOMETRIC ERROR MEASURING DEVICE

BACKGROUND OF THE INVENTION

1. Field of the Invention

The invention generally relates to a geometric error measuring device. More particularly, the invention relates to a geometric error measuring device which uses non-contact, optical measurement to measure geometric errors and which is highly accurate.

2. Description of the Prior Art

Laser interferometer has often been used in the measurement of geometric errors of machines and has been regarded as a very accurate measuring device. Because laser interferometer is characterized with large measurement range and nano level resolution, it has been used to measure geometric errors of many types of high-precision machines, such as CNC machines, CMM's (coordinate measuring machines), high-precision grinding machines and semiconductor manufacturing machines.

However, laser interferometer has not been widely used in the regular plants because of its high price. A laser interferometer with only the basic module of position error measurement has a price tag of NT$ 0.6 million; therefore regular plants can not afford it. A laser interferometer with the complete set of modules (including the modules for the measurement of straightness, squareness and rotational angles) costs more than NT$ 1.5 million. In addition, each module can measure only a certain type of error and each module requires different type of setup or arrangement; therefore, these factors further affect the willingness of using it.

Because each type of setup and the adjustment of the setup take time, methods and measuring systems have been developed to perform the measurement of several types of geometric errors simultaneously. In addition, a larger reflective lens has been used; however, in the set-up, such lens has to be perpendicular with the incident laser ray and other obstacles are yet to be overcome.

Therefore, to substantially lower the cost, we have developed a simple geometric error measuring device, which utilizes collimated light and at least one (quadrant) photodiode to measure errors in straightness, squareness and rotational angles (pitch, yaw and roll).

Moreover, in the geometric error measuring device of the present invention, three types of configurations or arrangements (for the measurement of straightness, squareness and rotational angles) have been used to simplify the measuring process and make it easier to use.

SUMMARY OF THE INVENTION

An object of the present invention is to provide a geometric error measuring device which has a simple design and is highly accurate.

Another object of the present invention is to provide a geometric error measuring device which has high resolution and is not affected by electromagnetic interference.

A third object of the present invention is to provide a geometric error measuring device which may be used in all types of workplaces and has the advantages of low cost, high accuracy, compactness and swiftness in measuring and is easy to carry and easy to set up.

To reach these objects, the geometric error measuring device of the present invention is disclosed. The geometric error measuring device of the present invention comprises a measuring module and at least one (quadrant) photodiode. The measuring module has an emitting deice, which may emit at least one light ray. The photodiode may receive the incident ray(s). The trajectory of the incident ray is parallel with the direction of measurement. If there is no geometric error, the position of the incident light ray will coincide with the position of the measured light ray. If there is a geometric error, the position of the measured light ray will not coincide with the position of the incident light ray. In the measurement of straightness, a single photodiode is used to receive the collimated ray from the measuring module so as measure the displacements on the other two axes. In the measurement of rotational angles, a single photodiode and a lens are used. In the measurement of roll, two photodiodes are used to receive the collimated light rays from the measuring module.

BRIEF DESCRIPTION OF THE DRAWINGS

The drawings disclose several illustrative embodiments of the present invention which serve to exemplify the various advantages and objects hereof, and are as follows.

DETAILED DESCRIPTION OF THE PREFERRED EMBODIMENTS

Figure 1:
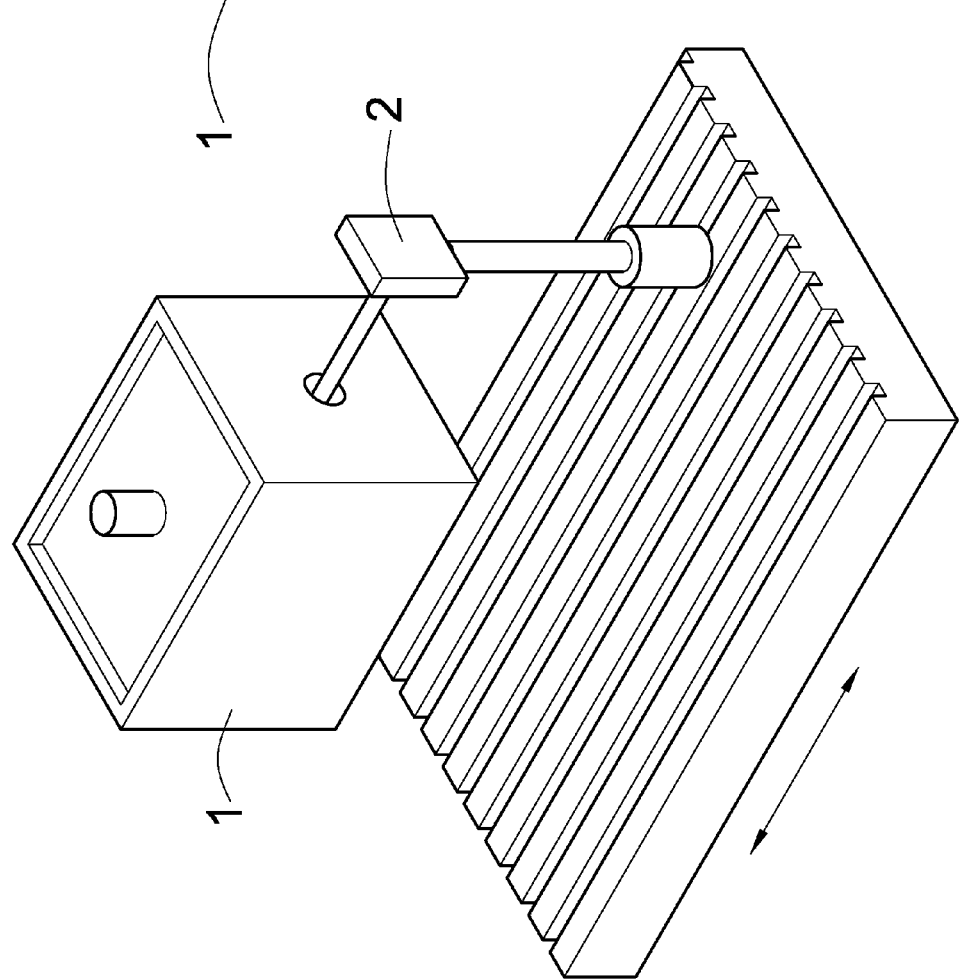
FIG. 1 is a perspective view illustrating that the emitting device emits a light ray into the photodiode in the measurement of straightness according to the present invention.

Please refer to FIG. 1, which illustrates the geometric error measuring device of the present invention. The geometric error measuring device of the present invention comprises a measuring module 1 and at least one (quadrant) photodiode 2.

The measuring module has an emitting deice, which may emit at least one light ray. The photodiode 2 may receive light rays.

The trajectory of the incident ray is parallel with the direction of measurement. If there is no geometric error, the position of the measured light ray will coincide with the position of the incident light ray. If there is a geometric error, the position of the measured light ray will not coincide with the position of the incident light ray.

The emitting device may be a laser light source or a collimated light source or may be a light source 11 that may emit a light ray, which may then be split into two or three rays by a medium lens. The medium lens may be a prism 12, a convergent lens or a collimating lens.

Figure 2:
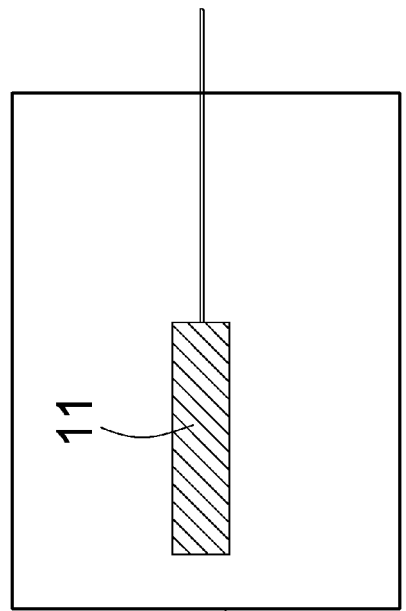
FIG. 2 is a sectional view illustrating that the emitting device emits a laser light ray or a collimated light ray according to the present invention.

As illustrated in FIG. 1, when a machine moves along the x-axis, it may deviate from the x-axis and generate displacements on the y-axis or z-axis. Such displacement is called error in straightness. In the device of the present invention, a straightness measuring device is configured by using a 2-D (quadrant) photodiode 2 and a measuring module 1 that can emit collimated light rays. Such straightness measuring device can simplified the measuring process for straightness. First, a collimated light source 11 emits a light ray into the photodiode 2 attached to the fixed end, as illustrated in FIG. 2. Also, the trajectory of the incident ray is parallel with the direction of measurement. Therefore, we can measure the error in straightness by comparing the position of the incident light ray and the position of the measured light ray. Therefore, by the virtue of the characteristics of 2-D (quadrant) photodiode 2, the errors of straightness on the y-axis and z-axis may be measured simultaneously and hence measuring time may be substantially reduced. The moveable end is the moveable axis (i.e., the axis along which the machine moves) or the moveable machine.

There are two types of configurations or arrangements to measure the errors in the straightness:

(1) Fixedly mount the measuring module 1 onto the fixed end of the measured machine. Mount the 2-D photodiode 2 onto the moveable end of the measured machine. The trajectory of the collimated light ray should be parallel with the axis that the machine moves along.

Figure 3:
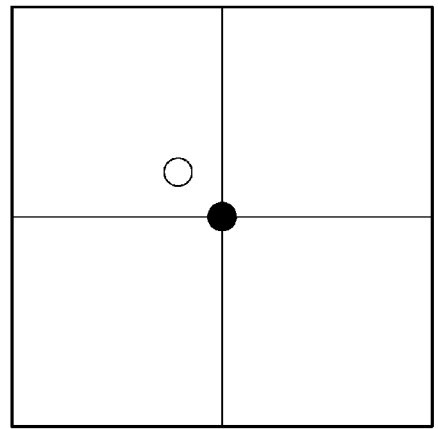
FIG. 3 is a view of the (quadrant) photodiode schematically illustrating that the position of the measured light ray will not coincide with the position of the incident light ray if there is a geometric error.

(2) Optionally, fixedly mount the measuring module 1 onto the moveable end of the measured machine. Mount the 2-D photodiode 2 onto the fixed end of the measured machine. During the measurement, the trajectory of the collimated light ray is parallel with the direction of the motion of the machine. If there is no geometric error, the position of the incident light ray will coincide with the position of the measured light ray. If there is a geometric error, the position of the measured light ray will not coincide with the position of the incident light ray, as illustrated in FIG. 3. In this case, with some calculation, we can obtain the errors of straightness along the y-axis and z-axis.

Figure 4:
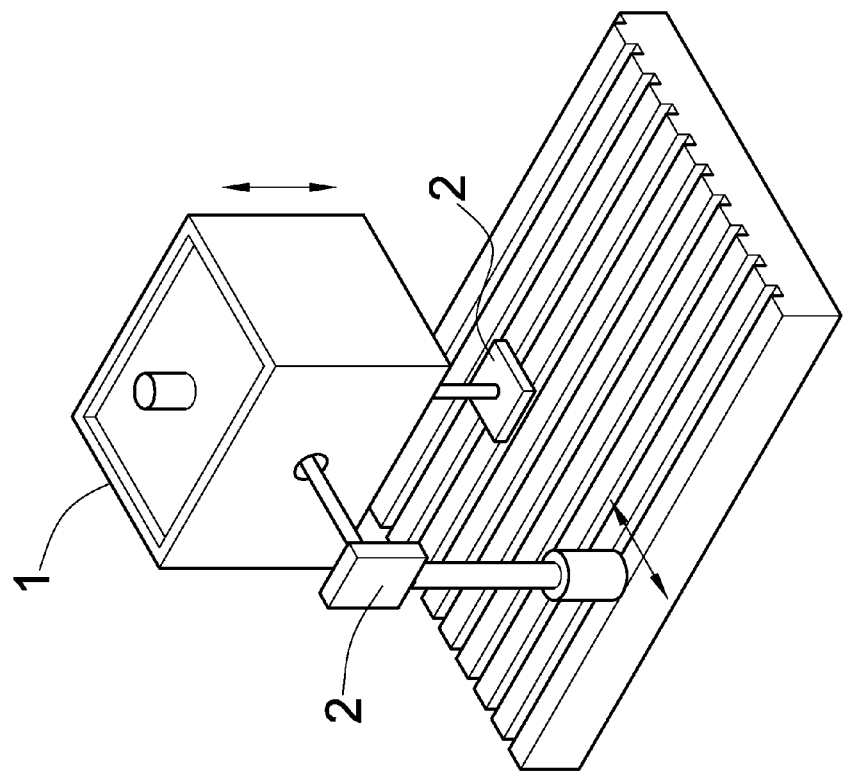
FIGS. 4 and 5 are two perspective views illustrating that the emitting device emits two perpendicular rays to two photodiodes in the measurement of squareness.
Figure 5:
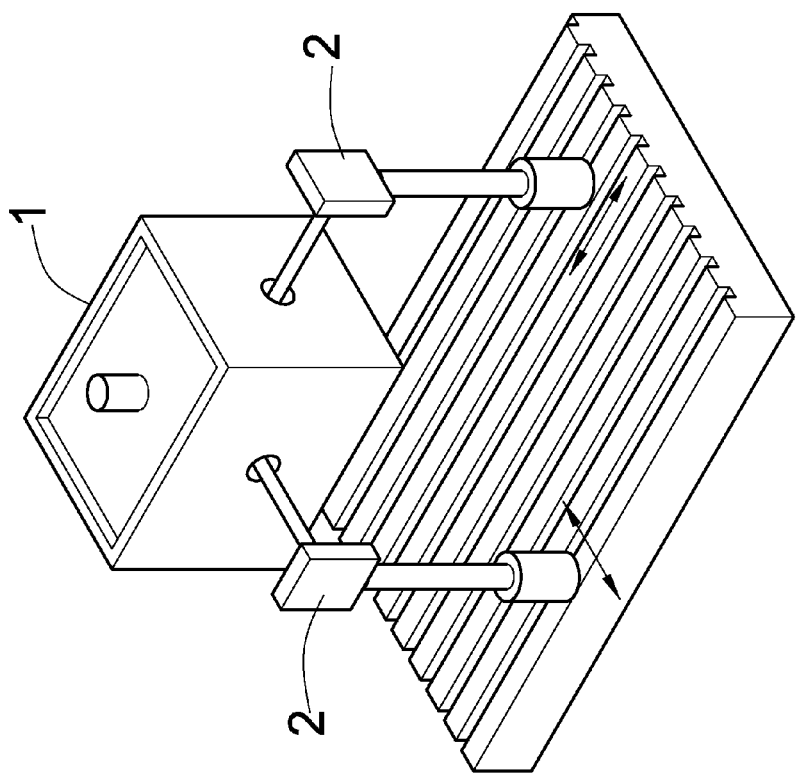

When a machine is assembled, perfect squareness (between the x-axis, y-axis and z-axis) often can not be achieved. As illustrated in FIGS. 4 and 5, a prism 12 is used along with the measuring module 1 and two 2-D photo diodes 2. The collimated light source 11 may emit a light ray into the prism 12, which then splits the incident ray into two mutually perpendicular rays—reflected ray and refracted ray. Each of these two rays then enters one of the two photo diodes 2. Therefore, we can measure the errors in squareness by comparing the positions of the incident rays and the positions of the measured light rays.

Figure 6:
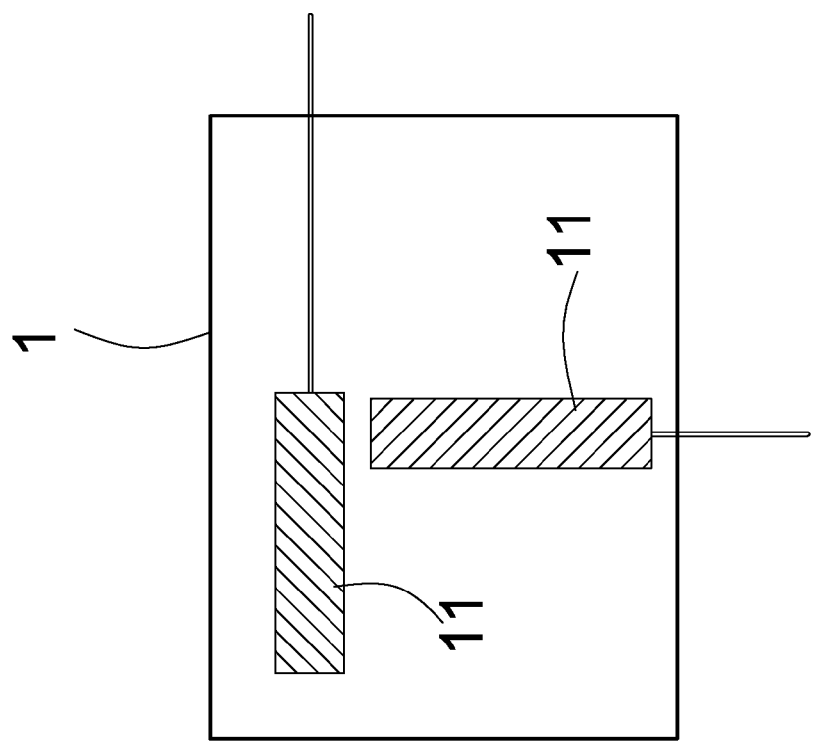
FIG. 6 is a view illustrating that two perpendicular laser/collimated light sources emit two perpendicular rays.

As illustrated in FIG. 6, the emitting devices may be two mutually perpendicular laser light sources 11 or two collimated light sources 11 so as to generate two mutually perpendicular incident rays.

Figure 7:
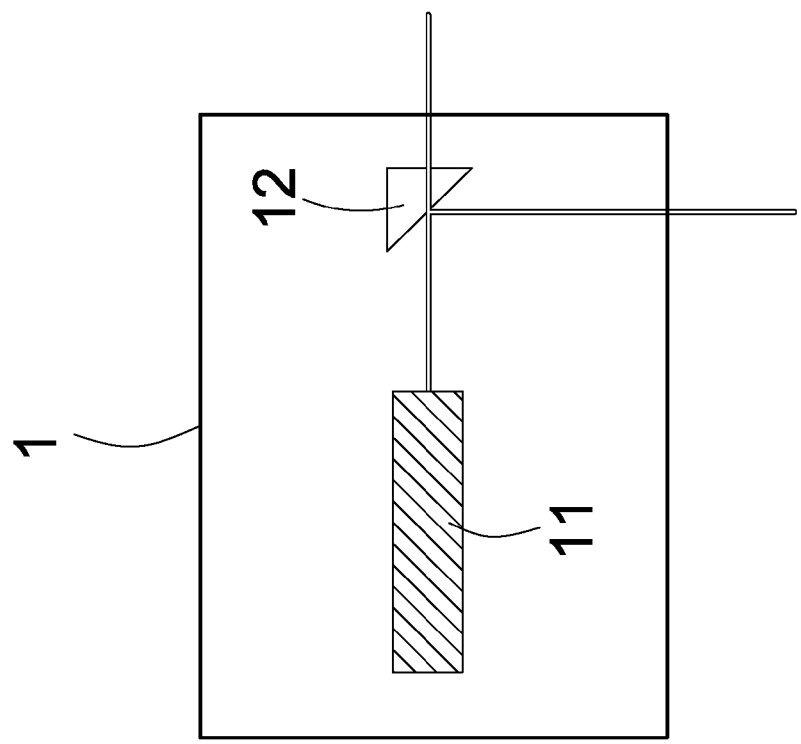
FIG. 7 is a view illustrating a laser/collimated light source emits a light ray into a medium lens (a prism), which then splits the ray into two perpendicular rays.

As illustrated in FIG. 7, a prism 12 may be used to split the incident ray sent out from a collimated light source 11 into two mutually perpendicular rays.

Figure 8:
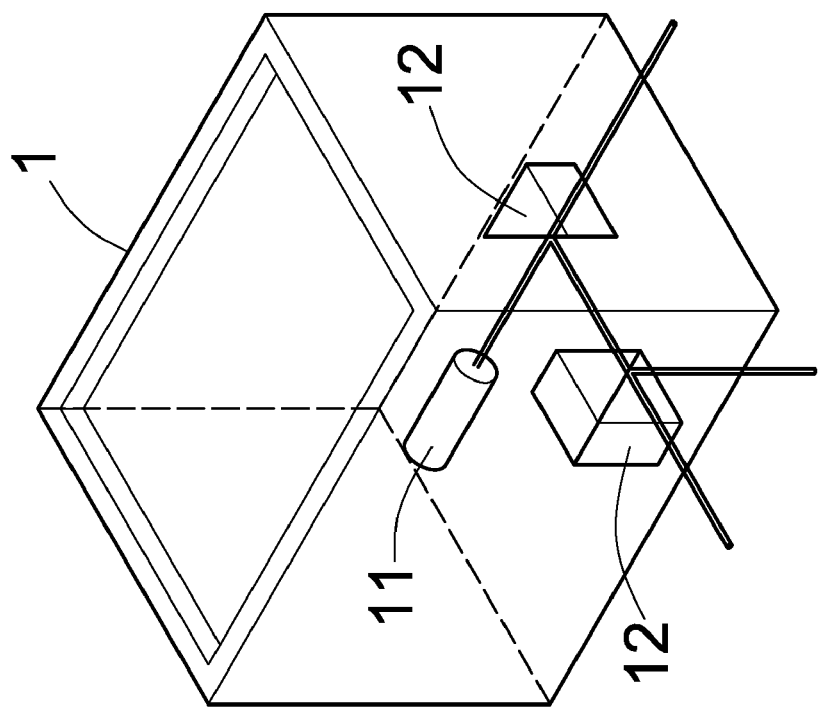
FIG. 8 is a view illustrating that a laser/collimated light source emits a light ray to several medium lenses, which then splits the ray into three perpendicular rays.

As illustrated in FIG. 8, two prisms 12 may be used to split the incoming collimated light ray 11 into three light rays that are mutually perpendicular to each other. Such arrangement may be used to measure the levels of squareness between the x-axis, y-axis and z-axis may be measured.

Figure 9:
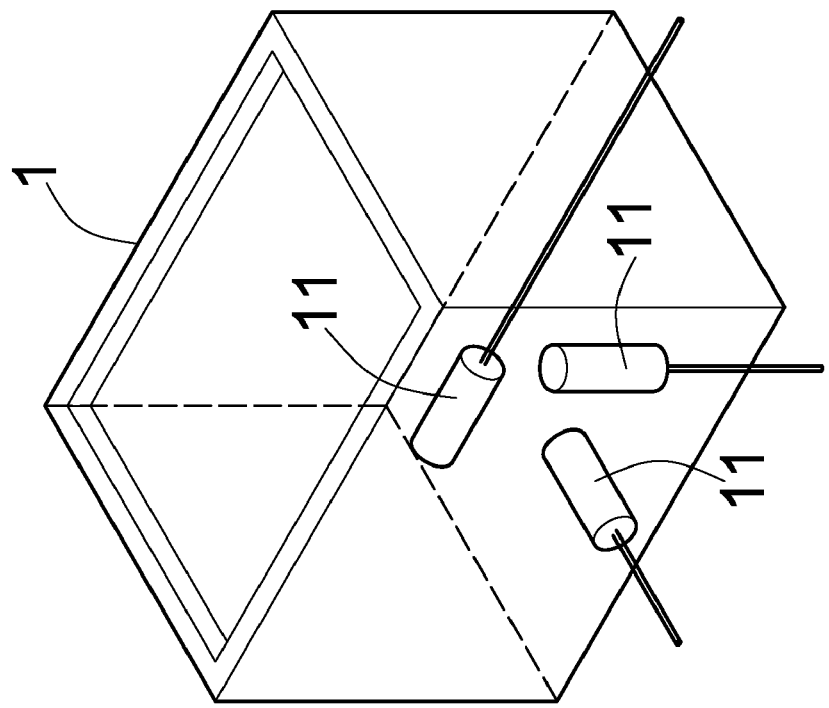
FIG. 9 is a view illustrating that three laser/collimated light sources emit three light rays that are mutually perpendicular.

Alternatively, as illustrated in FIG. 9, the emitting devices may be three light emitting devices 11 that may emit collimated light rays and that are arranged in a mutually perpendicular manner. Such arrangement may be used to measure the levels of squareness between the x-axis, y-axis and z-axis may be measured.

The moveable end is the axis along which the machine moves or the moveable machine. The measurement of squareness includes the following steps:

1. Mount measuring module 1 on the main axis of the machine.
2. Mount the photodiodes 2 on the machine.
3. The photodiodes 2 receives light rays.
4. With some calculation of the data, we may obtain the error in squareness.

Errors of rotational angles include errors in pitch, yaw and roll. The measurement of the device of the present invention includes two parts: (1) the first part—the measurement of the rotational angles of pitch and yaw (2) the second part—the measurement of the rotational angles of roll.

Figure 10:
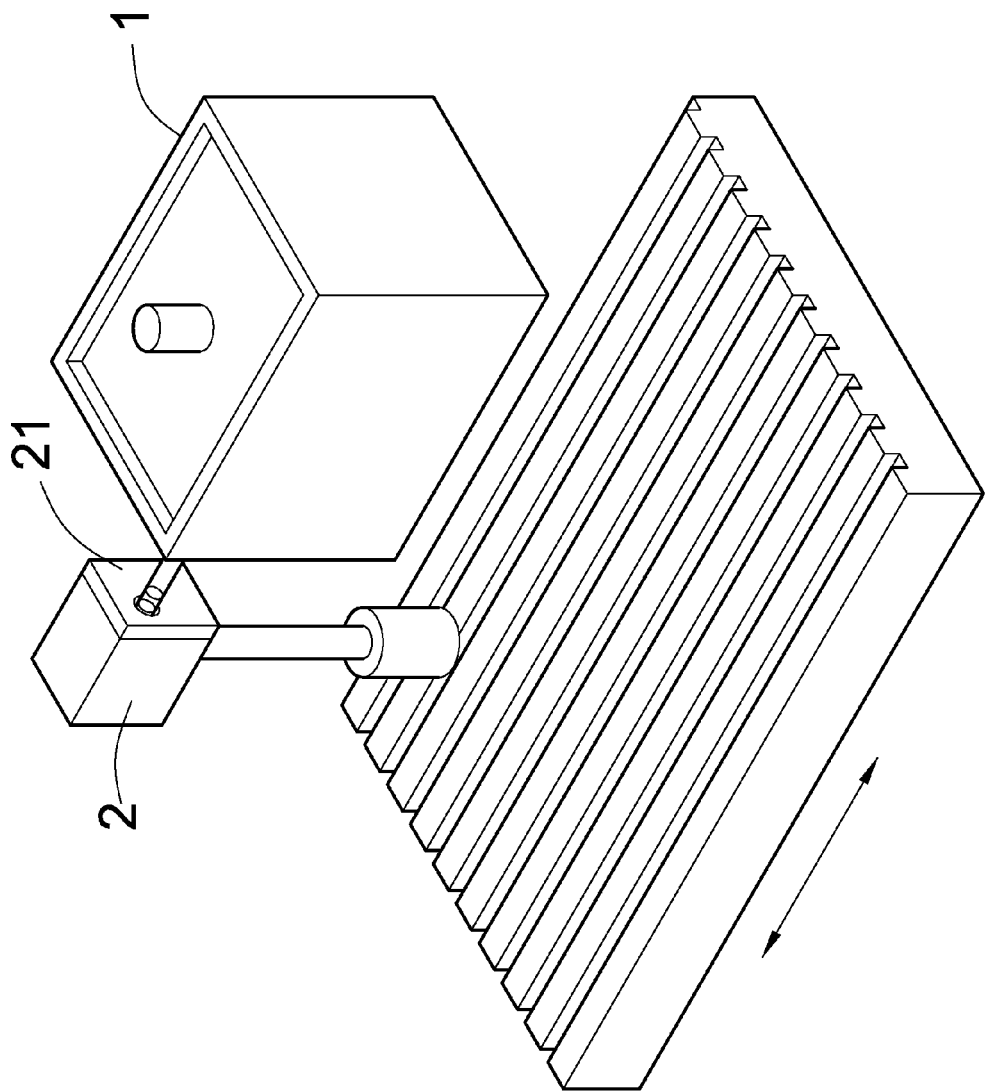
FIG. 10 is a perspective view illustrating that an emitting device emits a light ray into a convergent lens and then into a photodiode to measure the rotational angles in pitch and yaw.

Please see FIG. 10. The emitting device is a collimated light source 11. A convergent lens 21 is disposed at the input end of the photodiode 2 so that the trajectory of the incident ray is parallel with the direction of measurement. In addition, the factor of auto-collimation would eliminate the variation in the distance between the emitting device and the photodiode 2. Therefore, we can measure the rotational angles in pitch and yaw by comparing the position of the incident light ray and the position of the measured light ray. The measurement includes the following steps:

1. Mount the measuring module 1 on the fixed end of the measured machine and adjust the direction of incident ray so that it is parallel with the direction of measurement.
2. Fixedly mount the photodiode 2 onto the moveable end of the measuring module 1.
3. Activate the measured machine and perform the measurement.

Figure 11:
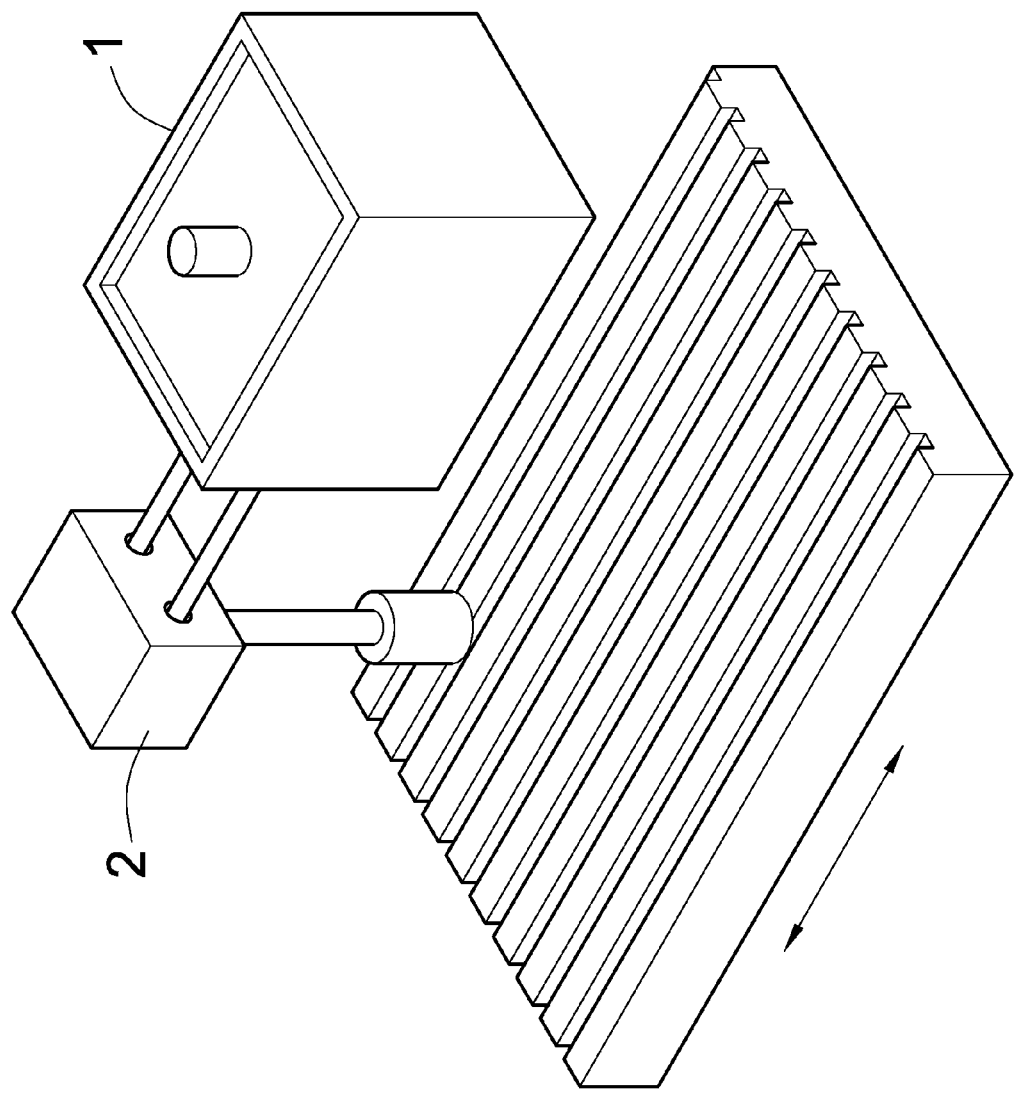
FIG. 11 is a perspective view illustrating that an emitting device emits two light rays into two photo diodes in the measurement of roll.
Figure 12:
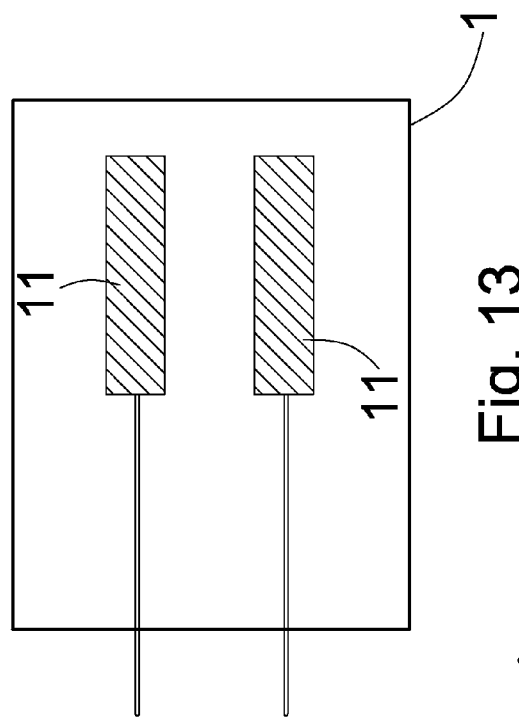
FIG. 12 is a view illustrating that an emitting device emits a laser/collimated light ray into several medium lenses, which splits the incident ray into two parallel rays.
Figure 14:
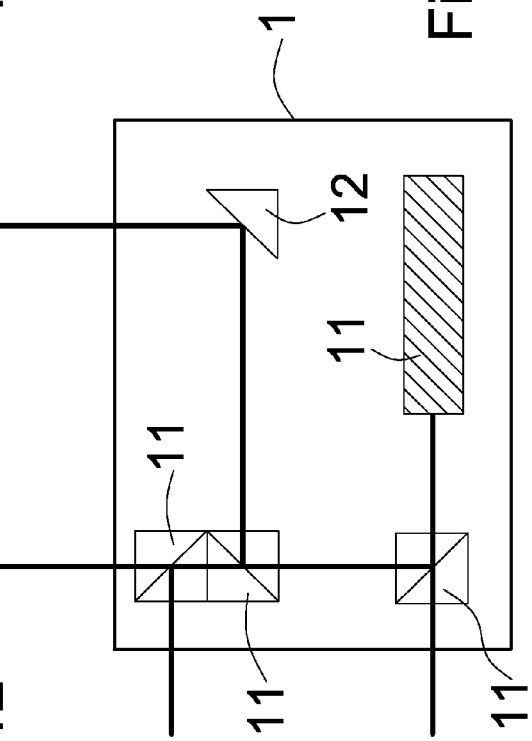
FIG. 14 is a view illustrating that an emitting device emits a laser/collimated light ray into several medium lenses, which splits the incident ray into two pairs of rays that are perpendicular to each other.

Now, please see FIGS. 11 and 12. Two prisms 12 are used to split a light ray coming from the collimated light source 11 into two parallel rays. If there is a roll, we can measure such roll by comparing the position of the emitting light rays and the position of the measured light rays. In FIG. 14, several prisms 12 are used to split the incident collimated light ray into two pairs of perpendicular rays so as to measure errors in squareness between x-axis and y-axis as well as y-axis and z-axis (or y-axis and z-axis as well as z-axis and x-axis; or z-axis and x-axis as well as x-axis and y-axis) simultaneously.

Figure 13:
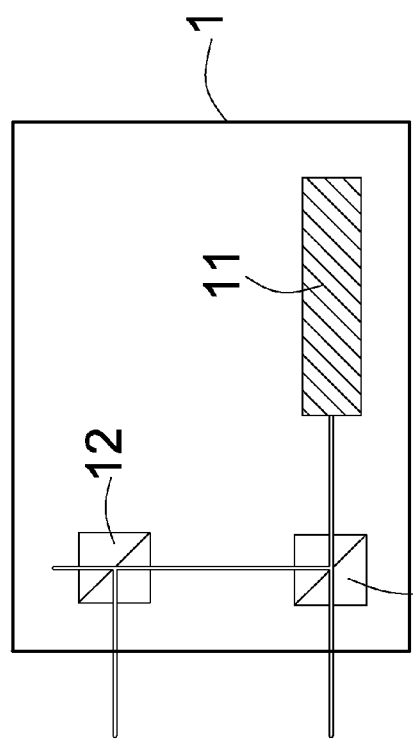
FIG. 13 is a side view illustrating that two parallel laser/collimated light sources are used to emit two parallel light rays.

Please see FIGS. 11 and 13. Two collimated light sources 11 are used to generate two parallel rays, which then enter two photodiodes 2 that are parallel to each other. If there is a roll, the measuring module 1 will rotate around the direction that the two photodiodes 2 moves. By comparing the positions of the incident light rays and the positions of the measured light rays, we can measure such roll.

If there is a roll, the measured machine would rotate in the same way. Therefore, by the use of two photodiodes 2, we can measure such roll. The measurement includes the following steps:

1. Mount the measuring module 1 on the fixed end of the measured machine and adjust the direction of incident rays so that they are parallel with the direction of motion of the measured machine.
2. Fixedly mount the photodiode(s) 2 onto the moveable end of the measuring module 1.
3. Activate the measured machine and perform the measurement.

During the measurement, the two collimated light sources 11 are parallel with the direction of motion of the measured machine. During the measurement, if there is no geometric error, the positions of the incident light rays will coincide with the positions of the measured light rays. If there is a geometric error, the positions of the measured light rays will not coincide with the positions of the incident light rays, as illustrated in FIG. 3. In this case, with some calculation, we can obtain such geometric error.

From the above, we can see that the geometric error measuring device of the present invention meets the relevant patent requirements. It is hoped that the patent application will be approved.

What is claimed is:

1. A geometric error measuring device, comprising:
    a measuring module located on a fixed/movable location of a machine, having an emitting device, which may emit at least one light ray; and
    at least one photodiode located on a movable/fixed location of the machine, which may receive the light ray from the emitting device,
    wherein trajectory of the light ray is parallel with a direction of measurement so a relative movement between the measuring module and the photodiode is along the trajectory of the light ray, and that, if there is no geometric error, a measured position of the light ray received by the photodiode will coincide with a reference position of the light ray received by the photodiode and that, if there is a geometric error, the measured position of the light ray will not coincide with the reference position of the light ray.

2. The geometric error measuring device as in claim 1, wherein the emitting device may be a single light source or two or more light sources.

3. The geometric error measuring device as in claim 1, wherein the emitting device may include a laser light source and at least one medium lens, which can split the light ray from the laser light source into two or three rays.

4. The geometric error measuring device as in claim 1, wherein, in the measurement of straightness, a collimated light source of the emitting device first emits the light ray and the light ray enters the photodiode, characterized in that a level of straightness may be measured by comparing the measured position of the light ray and the reference position of the light ray.

5. The geometric error measuring device as in claim 1, wherein, in the measurement of squareness, the emitting device first emits a light ray into a prism, which splits the light ray into two mutually perpendicular rays, and then the two perpendicular rays enter two mutually perpendicular photodiodes, characterized in that a level of squareness may be measured by comparing the measured positions of the light rays and the reference positions of the light rays.

6. The geometric error measuring device as in claim 1, wherein, in the measurement of pitch and yaw, a collimated light source of the emitting device first emits the light ray and the light ray then passes a convergent lens disposed at an input end of the photodiode and then reaches the photodiode, characterized in that a factor of auto-collimation would eliminate a variation in a distance between the emitting device and the photodiode and that levels of pitch and yaw may be measured by comparing the measured position of the light ray and the reference position of the light ray.

7. The geometric error measuring device as in claim 1, wherein, in the measurement of roll, two prisms are used to split the light ray coming from a collimated light source of the emitting device into two parallel rays and then the two parallel rays enter two photodiodes that are parallel to each other, characterized in that, if there is a roll, the measuring module will rotate around a direction that the two photodiodes move and that a level of the roll may be measured by comparing the measured positions of the light rays and the reference positions of the light rays.

8. The geometric error measuring device as in claim 1, wherein, in the measurement of roll, two collimated light sources of the emitting device that are parallel to each other are used and two rays from the two collimated light sources may enter two parallel photodiodes, characterized in that, if there is a roll, the measuring module will rotate around a direction that the two photodiodes move and that a level of roll may be measured by comparing the measured positions of the light rays and the reference positions of the light rays.

* * * * *